UNITED STATES PATENT OFFICE.

WALTER LAMB, OF ST. JOHN'S, NEWFOUNDLAND.

PROCESS OF PRESERVING FISH.

No. 827,452.  Specification of Letters Patent.  Patented July 31, 1906.

Application filed September 26, 1905. Serial No. 280,241.

*To all whom it may concern:*

Be it known that I, WALTER LAMB, a citizen of the United States, residing at No. 222 Water street, in St. John's, in the island of Newfoundland, have invented a new and useful Improvement in Processes of Preserving Fish, of which the following is a specification.

This invention is an improved process of preserving fish by which I am enabled to produce a food of desirable flavor containing all of the nutritiousness of fresh fish in a digestible form. It can be manufactured in very large quantities at very little expense and will keep in a perfect state of preservation in all climates. In carrying my invention into practice I proceed as follows: The fish are beheaded and eviscerated and subjected to the action of steam soon after being taken from the water. I use a cabinet and a series of long pans in steaming the fish, and with a medium-sized boiler for generating steam a half ton of fish can be cooked every one and a half hours. When the fish are cooked, they are divested of the skin and bones and put into a solution of salt of sufficient strength to preserve them. Sea-water to which salt has been added is preferable on account of the peculiar appetizing flavor which it gives to the fish. Other preservatives can be added to the sea-water, if desired. After the fish has taken up enough salt to preserve it it is packed in barrels or other receptacles, large or small, and is ready for shipment. It can be sent in a comparatively dry state or in a sufficient amount of the salt solution to cover it and to fill the small spaces between the masses of fish.

There are several distinct advantages in this method of fish preservation, among which is the conservation of the nutritious part of the fish. During the process of cooking the albuminous part is all coagulated and is rendered insoluble to the action of the preserving solution, whereas in the old method of preserving fish in salt solution the fish being treated in a raw state admits of the albuminous part being dissolved and soaked out both during the process of preservation and also in the process of removing the salt for preparation for the table. Another important point is that when fish are cooked and afterward preserved in a salt solution the fibrinous part does not become indurated and rendered indigestible, whereas the opposite occurs in fish tissue that is salted when in a raw state.

It will be observed that in this process no canning is required. Cooked fish has heretofore been preserved by being hermetically sealed in small packages. This method, apart from its expense, has its disadvantages in remote parts of the seacoast and where fish are caught in large quantities in nets and traps and require quick attention. By steaming the catch and putting it in barrels of salt solution for preservation a few men can handle enormous quantities in a few hours.

To prepare this fish product for the table, it is boiled for a few minutes in a given quantity of water to eliminate the right quantity of salt. It is then ready to be made into fish-cakes and other dishes known to the culinary art.

Having now particularly described and ascertained the nature of my said invention and in what manner the same is to be performed, I declare that what I claim is—

1. The method of preserving fish, which consists in beheading and eviscerating the fresh fish, then thoroughly cooking the same until all of the albuminous matter is coagulated to render it insoluble in brine, afterward immersing the fish in a saline solution to impregnate them sufficiently for preservation, then removing the fish, packing the same in a receptacle, and filling in the interstices with a preservative.

2. The method of preserving fish which consists in beheading and eviscerating the fresh fish, then steaming the fish until all of the albuminous matter is coagulated, then removing the skin and bones, then immersing the product in sea-water to which salt has been added, then removing the fish from said solution, and then packing the product in a preservative for shipment, making hermetic sealing unnecessary.

WALTER LAMB.

Witnesses:
 MAY O'MARA,
 J. FITZGERALD.